US010784618B2

(12) United States Patent
Wang

(10) Patent No.: US 10,784,618 B2
(45) Date of Patent: Sep. 22, 2020

(54) TRANSMISSION LINE WITH A PLUG HAVING A FOLDABLE BRACKET

(71) Applicant: Hongfeng Wang, Beijing (CN)

(72) Inventor: Hongfeng Wang, Beijing (CN)

( * ) Notice: Subject to any disclaimer, the term of this patent is extended or adjusted under 35 U.S.C. 154(b) by 0 days.

(21) Appl. No.: 16/231,410

(22) Filed: Dec. 22, 2018

(65) Prior Publication Data
US 2019/0393646 A1 Dec. 26, 2019

(51) Int. Cl.
*G06F 1/16* (2006.01)
*H01R 13/58* (2006.01)
*H01R 13/56* (2006.01)

(52) U.S. Cl.
CPC ....... *H01R 13/5841* (2013.01); *G06F 1/1613* (2013.01); *H01R 13/56* (2013.01)

(58) Field of Classification Search
CPC ............................. H01R 13/5841; G06F 1/1613
USPC ............. 439/557, 929; 320/111; 361/679.55, 361/679.59
See application file for complete search history.

(56) References Cited

U.S. PATENT DOCUMENTS

| | | | | |
|---|---|---|---|---|
| 5,075,615 A * | 12/1991 | Dantis | ................... | H01R 31/02 320/111 |
| 5,234,360 A * | 8/1993 | Kramer, Jr. | .......... | H01R 25/003 439/367 |
| 5,347,424 A * | 9/1994 | Akahane | ............... | G06F 1/1616 108/117 |
| 6,080,004 A * | 6/2000 | Kovacik | ............ | H01R 13/6392 439/352 |
| 6,290,517 B1 * | 9/2001 | Anderson | ............. | G06F 1/1616 439/131 |
| 8,014,147 B2 * | 9/2011 | Chen | ...................... | G06F 1/1616 200/61.62 |
| 8,083,195 B2 * | 12/2011 | Osada | .................. | F16M 11/041 248/274.1 |
| 8,170,623 B2 * | 5/2012 | Dorogusker | ........ | H04M 1/0258 455/573 |
| 8,279,594 B2 * | 10/2012 | Chen | ..................... | G06F 13/409 361/679.4 |
| 8,535,102 B1 * | 9/2013 | Colahan | ................. | H01R 31/06 439/638 |
| 8,693,181 B2 * | 4/2014 | Tseng | .................... | G06F 1/1635 312/223.1 |
| 8,737,064 B2 * | 5/2014 | Son | ....................... | G06F 1/1632 361/679.59 |
| 8,897,005 B2 * | 11/2014 | Huang | ..................... | H05K 7/16 361/679.01 |

(Continued)

*Primary Examiner* — Neil Abrams
(74) *Attorney, Agent, or Firm* — Zhihua Han; Wen IP LLC

(57) ABSTRACT

The present invention disclosed a transmission line with a foldable bracket, comprising: a first connector (1), a second connector (2), a wire body (3), and a support member (4); wherein the first connector (1) and the second connector (2) are connected through the wire body (3); the support member (4) comprises a connecting portion (5) and a supporting portion (6), the connecting portion (5) is disposed on the first connector (1) and pivoted to the first connector (1) rotatably, wherein the supporting portion (6) can rotate around the pivot. As a result, when an electronic mobile device needs to be propped up, the support member (4) of the transmission line can be opened to form a stable triangle structure between an edge of the electronic mobile device and the support member (4), to prop up the electronic mobile device.

13 Claims, 13 Drawing Sheets

(56) References Cited

U.S. PATENT DOCUMENTS

| | | | | |
|---|---|---|---|---|
| 8,902,575 B2* | 12/2014 | Zhou | ............... | F16M 11/041 |
| | | | | 361/679.3 |
| 8,961,220 B2* | 2/2015 | Hilbourne | ............ | H01R 13/516 |
| | | | | 439/502 |
| 8,968,012 B2* | 3/2015 | Olsson | ............... | H01R 13/562 |
| | | | | 439/131 |
| 9,236,687 B2* | 1/2016 | Aldereguia | .......... | H01R 13/633 |
| 9,438,298 B2* | 9/2016 | Abramovich | ........... | H04M 1/04 |
| 9,444,920 B2* | 9/2016 | Baschnagel | ........... | H04B 1/3883 |
| 9,466,927 B2* | 10/2016 | Ardisana, II | ....... | H01R 13/6315 |
| 9,582,048 B2* | 2/2017 | Ho | ........................ | G06F 1/1616 |
| 9,742,107 B2* | 8/2017 | Choi | ........................ | G06F 21/88 |
| 10,554,002 B2* | 2/2020 | Okazaki | ............... | H04B 1/3877 |
| 2003/0017746 A1* | 1/2003 | Lee | ........................ | H01R 31/06 |
| | | | | 439/638 |
| 2007/0254729 A1* | 11/2007 | Freund | ............... | H04M 1/0216 |
| | | | | 455/575.3 |
| 2011/0261519 A1* | 10/2011 | Chiu | ..................... | G06F 1/1616 |
| | | | | 361/679.02 |
| 2013/0270002 A1* | 10/2013 | Fawcett | ................ | H01R 11/01 |
| | | | | 174/845 |
| 2014/0057487 A1* | 2/2014 | May | ...................... | H01R 13/60 |
| | | | | 439/530 |
| 2014/0085814 A1* | 3/2014 | Kielland | ............. | F16M 11/041 |
| | | | | 361/679.55 |
| 2014/0139183 A1* | 5/2014 | Baschnagel, III | .... | H02J 7/0044 |
| | | | | 320/115 |
| 2014/0228075 A1* | 8/2014 | Baschnagel | ............. | H04M 1/04 |
| | | | | 455/557 |
| 2019/0393646 A1* | 12/2019 | Wang | ..................... | G06F 1/166 |

* cited by examiner

TRANSMISSION LINE WITH A PLUG HAVING A FOLDABLE BRACKET

CROSS REFERENCE TO RELATED APPLICATION

This application claims the priority benefit of Chinese Patent Application No. CN201810672901.3, filed on Jun. 26, 2018, entitled "A Folding Bracket Transmission Line"; Chinese Patent Application No. CN201820993904.2, filed on Jun. 26, 2018, entitled "A Folding Bracket Transmission Line"; and Chinese Patent Application No. CN2018216014830, filed on Sep. 29, 2018, entitled "Retractable Bracket, Data Cable Using the Same, Earphone, and Earphone Adapter"; which are hereby incorporated by reference in its entirety.

TECHNICAL FIELD

The invention relates to electronic technology, in particular, to a transmission line with a foldable bracket, including an extendable bracket.

BACKGROUND

With the rapid development of Internet and electronic products, transmission lines have become an indispensable accessory for mobile phones, tablet computers and other electronic mobile devices, because on one hand, transmission lines can connect electronic mobile devices to computers to perform tasks; on the other hand, transmission lines can also charge the electronic mobile devices.

The frequent use of smart application programs APP speeds up the power consumption of electronic mobile devices such as mobile phones and tablet computers, so that charging is constantly needed at any occasions for mobile phones, tablet computers, etc. The frequency of transmission line use is greatly increased, and demands for auxiliary functions to be performed by transmission lines are also growing.

With the rapid development of information technology, the connection methods of various electronic products have become a useful technical research field. Data cables and earphones have become popular electronic devices in people's lives and indispensable accessories for electronic mobile devices such as mobile phones and tablet computers.

However, the existing data lines and earphones have a single function. Therefore, how to bestow more practical functions on earphones through compact design is a technical problem that awaits solution.

One potential solution is to liberate users' hands from the requirement to hold onto an electronic device, even when the users are watching entertainment program or listening to the music on the mobile device. The challenges include to keep the screen of the device stably at an easily adjustable angle, without adding much weight, cost, and volume to the device.

SUMMARY

In view of the above, one objective of the present invention is to provide a transmission line with a foldable bracket that can realize more useful functions.

In order to achieve the above goals, the present invention discloses technical solutions as described below.

A transmission line with a foldable bracket, comprising: a first connector (1), a second connector (2), a wire body (3), and a support member (4); wherein the first connector (1) and the second connector (2) are connected through the wire body (3); wherein the support member (4) comprises a connecting portion (5) and a supporting portion (6), the connecting portion (5) is disposed on the first connector (1) and pivoted to the first connector (1) rotatably to form a rotatory connection, so that the supporting portion (6) can rotate around the pivot.

Preferably, the supporting portion (6) of the support member (4) has a rotation angle of [0°, 100°] (i.e., from 0° to 100°); when the supporting portion (6) is closed, the angle between the center line of the support member (4) and the plane in which the first connector (1) is inserted is 0°; when the supporting portion (6) is opened at the maximum angle, the angle between the center line of the support member (4) and the plane in which the first connector (1) is inserted is 100°.

In some embodiments, the support member (4) is a semi-closed groove comprising two long side walls (7), a short side wall (8) and a rear wall (9).

Preferably, a protrusion portion (10) is provided on each side of the first connector (1); and a connection hole (11) is provided on each of the long side walls (7) of the support member (4), wherein the protrusion portions (10) are inserted into the connection holes (11) to form the rotatory connection.

Preferably, the wire body (3) is has a circular shape in cross section, a circular arc-shaped notch (12) is provided on the short side wall (8), so that wherein when the support member (4) is in a closed position, the wire body (3) passes through the circular arc-shaped notch (12) in a close fit and is confined in position.

In one embodiment, the wire body (3) is has a rectangular shape in cross section, and a rectangular or square notch (12) is provided on the short side wall (8), so that when the support member (4) is in a closed position, the wire body (3) passes through the rectangular or square notch (12) in a close fit and is confined in position.

Preferably, a recess (14) is provided on the rear wall (9), so that when the support member (4) is opened to the maximum angle, the recess (14) pushes against the first connector (1) and restricts the maximum opening angle to 100°.

In some embodiments, the foldable bracket can be is extendable to provide more flexibility when used to support an electronic mobile device. The transmission line with an extendable foldable bracket has a connecting portion (5) comprises a fixed-length segment (210) that further comprises two connecting arms (110), a wire-holding slot (120), and a buckle beam (24) on the back of the wire-holding slot (120); and a supporting portion (6) that comprises an movable segment (211) that further comprises a receiving slot (21), a closing buckle (22), and at least one extension buckle (23).

In some embodiments, the receiving slot (21) is configured to move along the wire-holding slot (120) between a non-extended position and an extended position, wherein the non-extended position is configured to be maintained by the interaction of the buckle beam (24) with the closing buckle (22), and the extended position is configured to be maintained by the interaction of the buckle beam (24) with the extension buckle (23).

In some embodiments, the transmission line with the extendable foldable bracket further comprises a protrusion portion (10) disposed on each side of the first connector (1); and a connection hole (11) on each of the two connecting arms (110) of the support member (4), wherein the protrusion portions (10) are inserted into the connection holes (11) to form the rotatory connection.

In some embodiments, the wire-holding slot (120) comprises two side walls and a bottom wall that forms the slot that hold wires or lines.

The transmission line with the extendable foldable bracket further comprises a rectangular elastic piece (125) with one end connected to the bottom wall, and one free end on which the buckle beam (24) is attached, wherein the rectangular elastic piece (125) is formed by two parallel opening stripes (124) that cut through the bottom wall and one perpendicular stripe that also cuts through the bottom wall adjacent to the free end.

Preferably, the first connector (1) is a plug for connecting an electronic mobile device.

Preferably, the electronic mobile device is a mobile phone or a tablet computer.

Preferably, the transmission line is a data line or a charging line.

Since the support member (4) is disposed on the first connector (1) of the transmission line, when the electronic mobile device needs to be propped up, the support member (4) of the transmission line can be placed into the open position, so that the edge of the electronic mobile device and the support member (4) form a stable structure, thereby propping up the electronic mobile device.

Other embodiments of the present invention will become readily apparent to those skilled in the art from the following detailed description, wherein is described embodiments of the invention by way of illustrating the best mode contemplated for carrying out the invention. As will be realized, the invention is capable of other and different embodiments and its several details are capable of modifications in various obvious respects, all without departing from the spirit and the scope of the present invention. Accordingly, the drawings and detailed description are to be regarded as illustrative in nature and not as restrictive.

DETAILED DESCRIPTION OF THE PREFERRED EMBODIMENTS

It is apparent that the described embodiments are a part, rather than the entire embodiments of the invention. All other embodiments obtained by those of ordinary skill in the art based on the embodiments of the present invention without creative efforts are within the scope of the present invention.

It should also be noted that the terms "comprise", "include", or any other variation thereof are intended to encompass non-exclusive inclusions such that the products, devices, processes or methods not only include the limitations or elements, but also may include other elements not explicitly listed, or include elements inherent to such products, equipment, processes or methods, if necessary. Unless defined by further limitation, an element or limitation introduced by statements of "comprise", "comprising", or "include" does not exclude the presence of additional identical elements or limitation in the products, devices, processes, or methods.

In practical applications, usage of electronic mobile products such as mobile phones or tablets by users are both frequent and lengthy, and transmission lines are routinely used to transmit data or charge the device. In this case, the inventor came up with the idea that if the frequently used transmission line is given a support function, not only the transmission function can be guaranteed, but also the user's hands can be liberated, so that the user will have a better experience. To this end, the following embodiments of the present invention provide several transmission lines with foldable bracket in order to impart more and better functionality to conventional transmission lines.

One purpose of the invention is to provide a foldable bracket, which compensates for the defects of existing data line, earphone and the earphone adapter. The bracket structures disclosed in the invention can be incorporated into a data line, a charging line, an earphone, or the earphone adapter. By introducing an extendable supporting segment, the viewing angle of the electronic device can be adjusted according to needs, the volume of the foldable bracket can be reduced, and the appearance is the device is enhanced.

Embodiment 1

Figure 1:
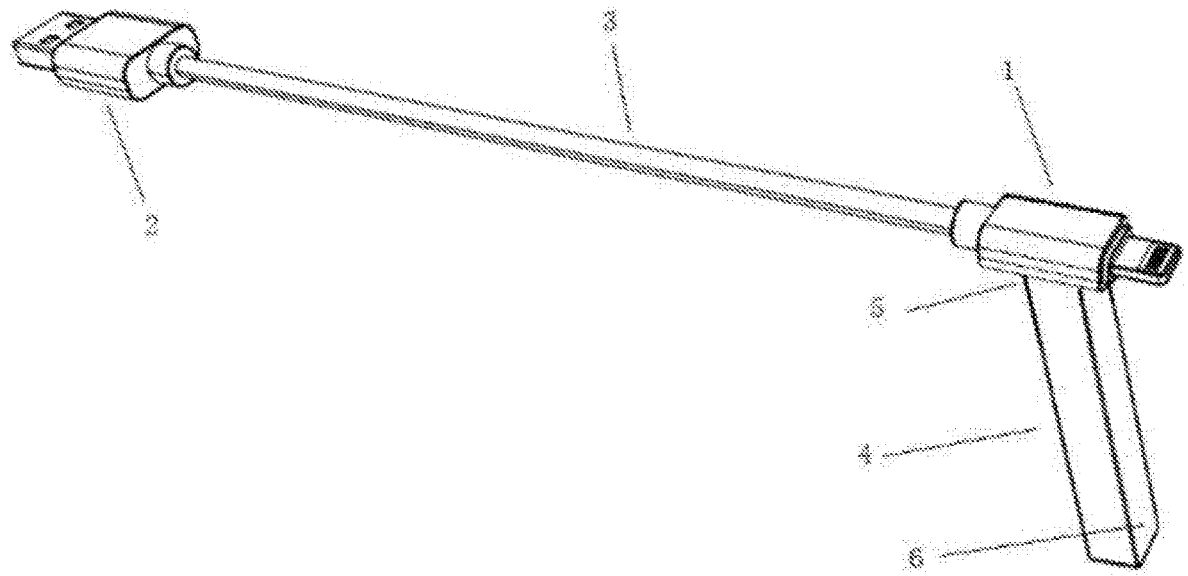
FIG. 1 is a prospective view of a transmission line with a foldable bracket in Embodiment 1 of the present invention, according to one embodiment.

FIG. 1 is a diagram of a transmission line with a foldable bracket in the Embodiment. As shown in FIG. 1, the comprises a first connector (1), a second connector (2), a wire body (3), and a support member (4). The first connector (1) and the second connector (2) are connected through the wire body (3). The support member (4) comprises a connecting portion (5) and a supporting portion (6), the connecting portion (5) is disposed on the first connector (1) and pivoted to the first connector (1) rotatably to form a rotatory connection, so that the supporting portion (6) can rotate around the pivot.

Here, the first connector (1) can be a plug that is connected to a mobile electronic device such as a cellphone or a tablet. the second connector (2) can be a plug connected to an electricity source, or used for data transfer and electricity charging for the mobile electronic device. The rotatory connection referred in this Embodiment refers to one end of the support member (4), i.e., the connecting portion (5), being installed on the first connector (1), the installation can be fixed or detachable. Meanwhile, the other end, i.e., the supporting portion (6) of the support member (4) can rotate around the conjuncture or joint between the first connector (1) and the support member (4). In this situation, the joint corresponds to a shaft, and the supporting portion (6) of the support member (4) is free to rotate about the shaft. In a specific implementation, a shaft can be provided on the first plug (1), and the connecting portion (5) is connected to the shaft to allow the rotatory connection. Alternatively, the connecting portion (5) can be arranged to connect to the first connector (1) directly through a curvature at the joint, therefore allowing rotatory connection.

That is to say, when the transmission line of the first embodiment is inserted into an electronic mobile device such as a mobile phone or a tablet computer, for example, when data transmission or charging is performed, if the electronic mobile device needs to be propped up or supported, the support member (4) of the transmission line can be opened to a opened position, and the supporting portion (6) can be rotated to a suitable angle so that the edge of the mobile electronic device and the supporting portion (6) form a stable triangular structure to support the electronic mobile device. The angle at which the rotary connection needs can be set by the manufacturer or the user who applies the solution of the present invention, and can be any angle or adjusted according to the size or weight of the mobile phone or tablet.

FIG. 1 only illustrates one design of the support member (4). As for the details of the support member, such as its shape, length, size and connection to the first connector (1), manufacturers applying the method of the present invention may set and design their own configurations according to needs. As long as the support member (4) is located on the first connector (1) inserted into the electronic mobile device and can be freely rotated to form a stable supporting structure, such a solution will be within the protection scope of the present invention.

Embodiment 2

Figure 2:
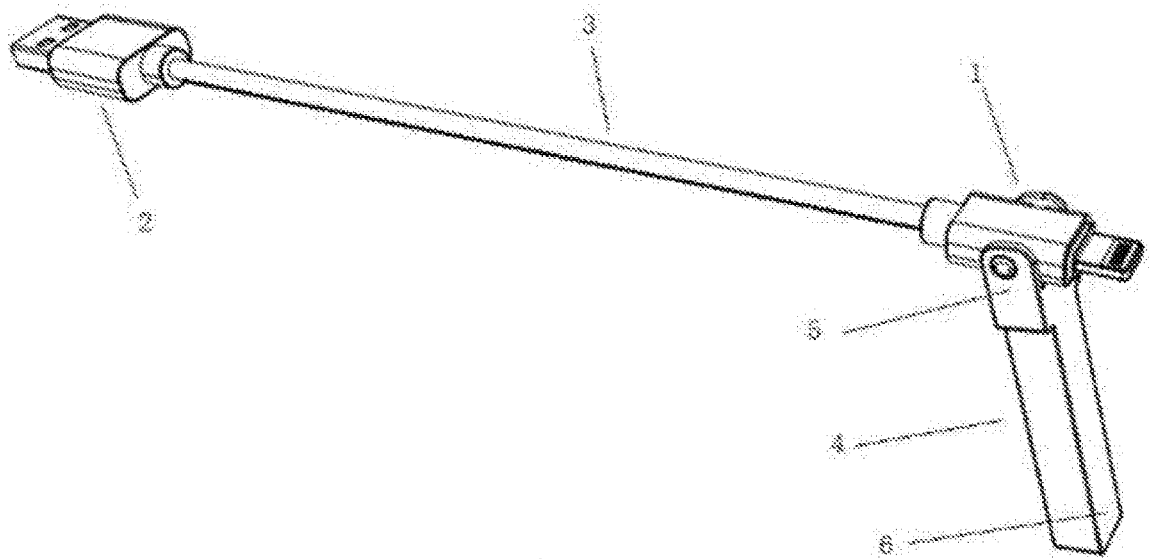
FIG. 2 is a prospective view of a transmission line with a foldable bracket in Embodiment 2 of the present invention, according to one embodiment.

FIG. 2 is a diagram of a transmission line with a foldable bracket in Embodiment 2 of the present invention. The wire body (3) can be round or rectangular shape in the cross section but for illustration purpose the round shape is used and a data transmission line is depicted here. As shown in FIG. 2, the data transmission line includes 1. A transmission line with a foldable bracket, comprising: a first connector (1), a second connector (2), a wire body (3), and a support member (4); wherein the first connector (1) and the second connector (2) are connected through the wire body (3); wherein the support member (4) comprises a connecting portion (5) and a supporting portion (6), the connecting portion (5) is disposed on the first connector (1) and pivoted to the first connector (1) rotatably to form a rotatory connection, so that the supporting portion (6) can rotate around the pivot.

Figure 3:
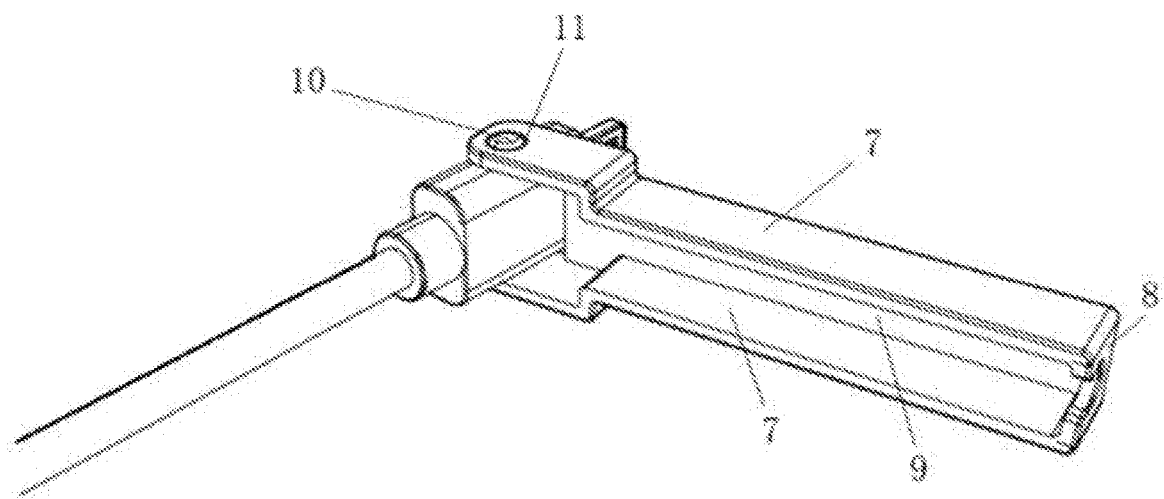
FIG. 3 is an enlarged partial view of a transmission line with a foldable bracket in Embodiment 2 showing a support member (4), according to one embodiment.
Figure 4:
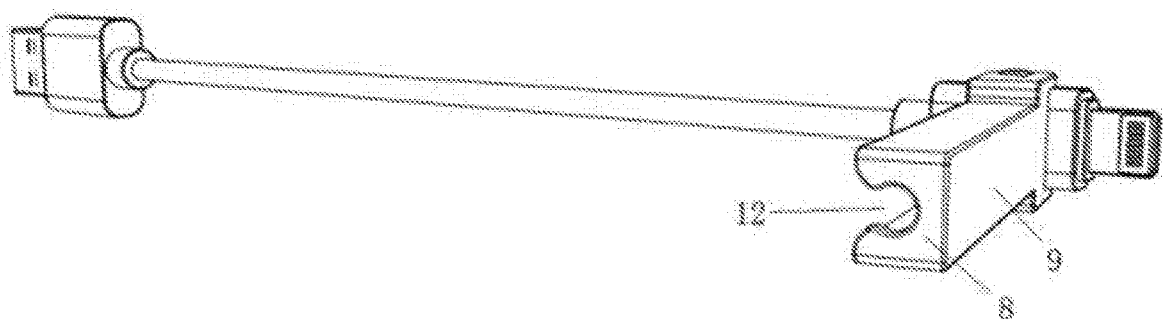
FIG. 4 is a prospective view of a transmission line with a foldable bracket in Embodiment 2 of the present invention, according to one embodiment.
Figure 5:
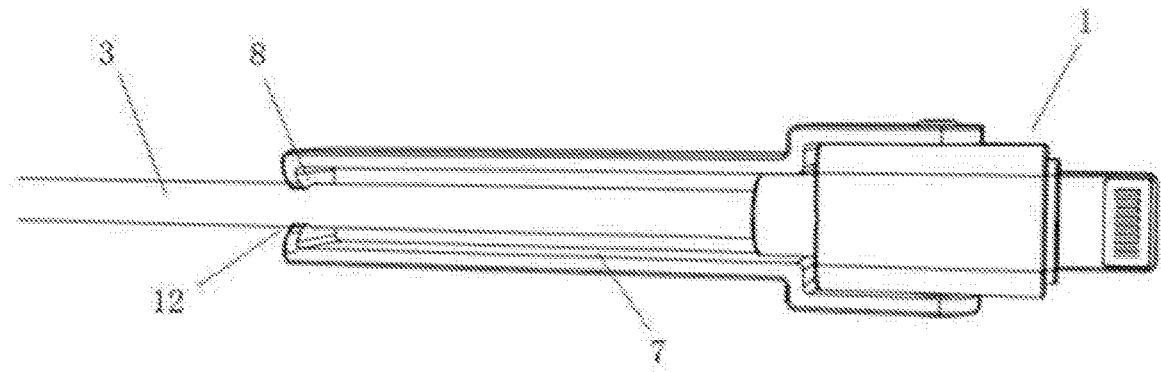
FIG. 5 is a diagram showing the support member (4) in the closed position in Embodiment 2 of the present invention, according to one embodiment.

Furthermore, the support member (4) of the present embodiment may be provided as a semi-closed groove, and FIGS. 3 and 4 are partial enlarged views of the support member (4). As shown in FIG. 3, the support member (4) includes a long side wall (7), a short side wall (8) and a rear wall (9). The intercepting angle between the long side wall (7) and the short side wall (8) are shaped into smooth and arc-shaped curvature in the exterior in order to facilitate support. A protrusion portion (10) is provided on both sides of the first connector (1), connection hole (11) is provided on the long side wall (7) of the support member (4), the protrusion portions (10) are inserted into the connection holes (11) to form the rotatory connection. The protrusion member can be a cylinder or other shape such as triangle or square column. The connection hole (11) adopts a corresponding shape to the protrusion portion (10), and a circle is depicted here. the diameter of the connection hole (11) is slightly larger than that of the protrusion portion (10) cylinder. When the protrusion portion (10) is inserted into the connection hole (11), a rotatory connection is established. As shown in FIG. 4, a circular arc-shaped notch (12) is provided on the short side wall (8), so that when the support member (4) is in a closed position, the wire body (3) can pass through the circular arc-shaped notch (12) and be held in place by the constriction of the notch. Thus, when support is not desired, the support member (4) can be placed in the closed position and unobtrusively held against the wire body (3) without interfering the movement of the data transmission line. FIG. 5 further illustrates the support member (4) in the closed position.

In practical applications, when the rotation angle of the support member (4) is too large, the mobile electronic device is likely to fall down. To avoid this, the present embodiment sets the angle of rotation of the supporting portion (6) of the support member (4) to [0°, 100°]. That is, when the supporting portion (6) is in a closed position, the angle between the center line of the support member (4) and the plane in which the first connector (1) is inserted is 0°. When the supporting portion (6) is opened at the maximum angle, the angle between the center line of the support member (4) and the plane in which the first connector (1) is inserted is 100°. It is known to those skilled in the art that the connector inserted into the electronic mobile device is flat, and the flat plane is the plane in which the first connector (1) is inserted in the Embodiment. In vast majority of situations, this plane is also the plane where the screen of the electronic mobile device is located. When the supporting member (4) rotates at a certain angle, it also forms a certain angle with the plane where the screen of the electronic mobile device is located, and the supporting portion (6) serves as a supporting point, thereby stably supporting or popping up the segment.

There are many ways to set the rotation angle of the support member (4) to [0°, 100° ]. For example, in some embodiments, turn-stop point may be installed on the inner walls between the protrusion portion (10) and the connection hole (11) so that when the supporting portion (6) rotates to 100°, the support member (4) will click into position and stay at 100°. Alternatively, as shown in FIG. 4, the rear wall (9) of the support member (4) of the present embodiment is shorter than the long side wall (7). This will leave room for accommodating the first connector (1). This also creates an opening or a recess (14) at the rear wall (9). When the support member (4) is opened to the maximum angle, the opening or recess (14) comes into contact with body of the first connector (1) and prevents the support member (4) from turning further. As a result, the maximum opening angle is 100°.

It should be emphasized that setting the rotation angle of the support member (4) to the range of 0° to 100° ([0°, 100°]) is only one way of implementation the Embodiment. In practical applications, other angles such as 90° or 120°, may also be used. The angel can be determined by the user who applies the solution of the present invention, and will not be described here.

Embodiment 3

Figure 6:
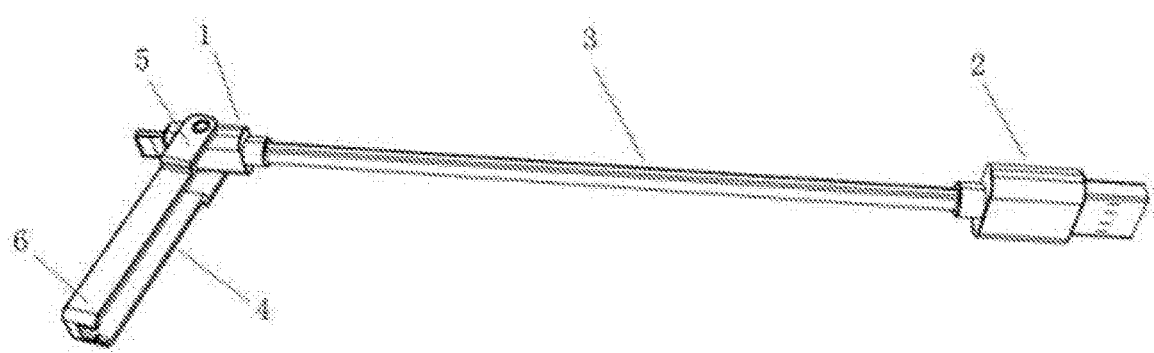
FIG. 6 is a diagram of a transmission line with a foldable bracket in Embodiment 3 of the present invention, according to one embodiment.

FIG. 6 is a diagram of a transmission line of this Embodiment. The cross section of the wire body (3) can be various shape but is described as rectangular in this Embodiment and the transmission line is depicted as a charging line. As shown in FIG. 6, the data line a first connector (1), a second connector (2), a wire body (3), and a support member (4); wherein the first connector (1) and the second connector (2) are connected through the wire body (3); wherein the support member (4) comprises a connecting portion (5) and a supporting portion (6), the connecting portion (5) is disposed on the first connector (1) and pivoted to the first connector (1) rotatably to form a rotatory connection, so that the supporting portion (6) can rotate around the pivot.

Figure 7:
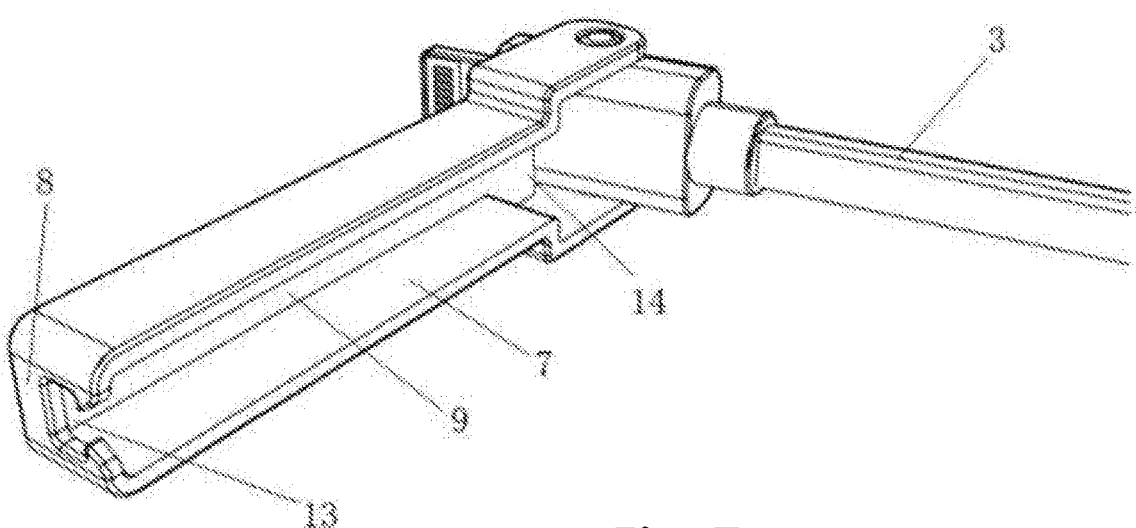
FIG. 7 is an enlarged partial view of a transmission line with a foldable bracket in Embodiment 3 of showing a support member (4), according to one embodiment.

Similar to the Embodiment 2, the support member (4) of the present embodiment can also be provided as a semi-closed groove, and FIG. 7 is a partial enlarged view of the support member (4). As shown in FIG. 7, the support member (4) also includes a long side wall (7), a short side wall (8) and a rear wall (9). A protrusion portion (10) is provided on both sides of the first connector (1), connection holes (11) are provided on the long side walls (7) of the support member (4), the protrusion portions (10) are inserted into the connection holes (11) to form the rotatory connection. One difference is that the cross section of the wire body (3) is rectangle and the short side wall (8) has a square-shaped notch, so that when the support member (4) is in a closed position, the wire body (3) can pass through the square-shaped notch and be held in place by the constriction of the notch. Thus, when support is not desired, the support member (4) can remain in the closed position and unobtrusively held against the wire body (3) without interfering the movement of the transmission line. FIG. 5 further illustrates the support member (4) in the closed position.

Similar to the Embodiment 2, the present embodiment sets the rotation angle of the supporting portion (6) of the support member (4) to [0°, 100°]. That is, when the supporting portion (6) is closed, the angle between the center line of the support member (4) and the plane in which the first connector (1) (1) is inserted is 0°. When the supporting portion (6) is opened at the maximum angle, the angle between the center line of the support member (4) and the plane in which the first connector (1) is inserted is 100°. It is known to those skilled in the art that the connector inserted into the electronic mobile device is flat, and the flat plane is the plane in which the first connector (1) is inserted in the Embodiment. This plane is also the plane where the screen of the electronic mobile device is located. When the supporting member (4) rotates at a certain angle, it also forms a certain angle with the plane where the screen of the electronic mobile device is located, and the supporting portion (6) serves as a supporting point, thereby stably supporting or popping up the segment.

The rear wall (9) of the support member (4) of the present embodiment is shorter than the long side wall (7). This will leave room for accommodating the first connector (1). This also creates an opening or a recess (14) at the rear wall (9). When the support member (4) is opened to the maximum angle, the opening or recess (14) comes into contact with body of the first connector (1) and prevents the support member (4) from turning further. As a result, the maximum opening angle is 100°.

It should be emphasized that setting the rotation angle of the support member (4) to [0°, 100°] is only one way of implementing the Embodiment. In practical applications, other angles such as 90° or 120°, may also be used. The angel can be determined by the user who applies the solution of the present invention, and will not be described here.

Figure 8:
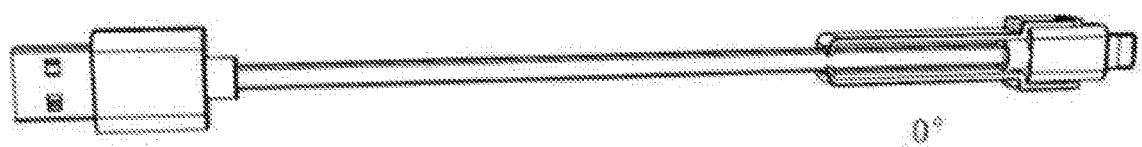
FIG. 8 is a diagram of a transmission line with a foldable bracket showing the support member (4) at a rotation angle of 0° (closed position) in Embodiment 4 of the present invention, according to one embodiment.
Figure 9:
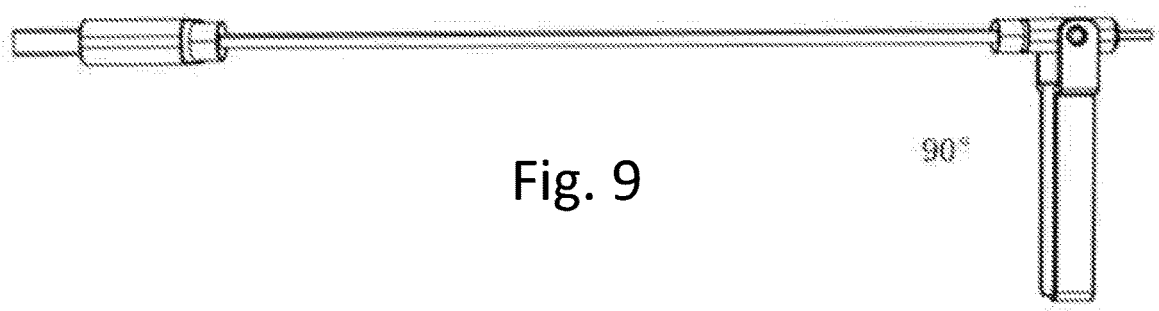
FIG. 9 is a diagram of a transmission line with a foldable bracket, showing the support member (4) at a rotation angle of 90° (open position) in Embodiment 4 of the present invention, according to one embodiment.
Figure 10:
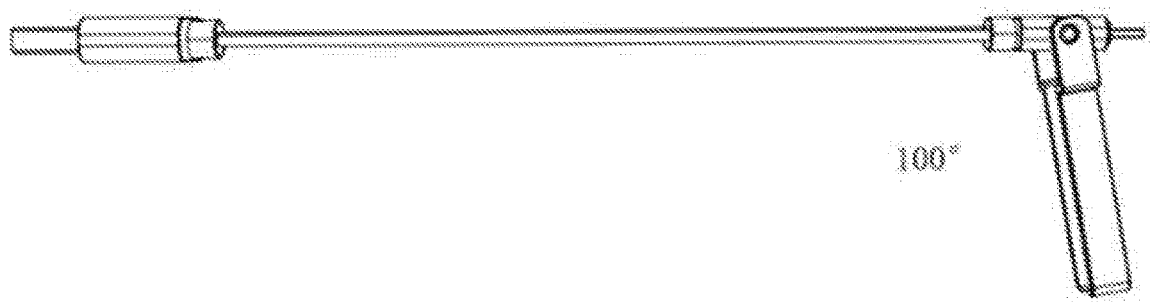
FIG. 10 is a diagram of a transmission line with a foldable bracket, showing the support member (4) at a rotation angle of 100° (open position) in Embodiment 4 of the present invention, according to one embodiment.
Figure 11:
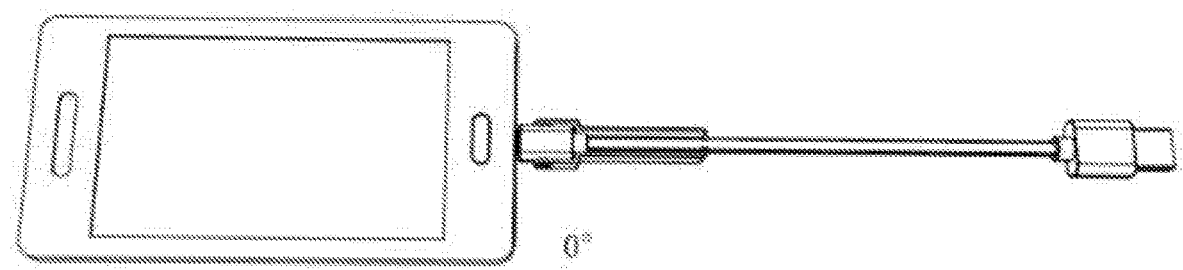
FIG. 11 is a diagram of a transmission line with a foldable bracket connected to an electronic device, showing a support member (4) at a rotation angle of 0° (closed position) in Embodiment 4 of the present invention, according to one embodiment.
Figure 12:
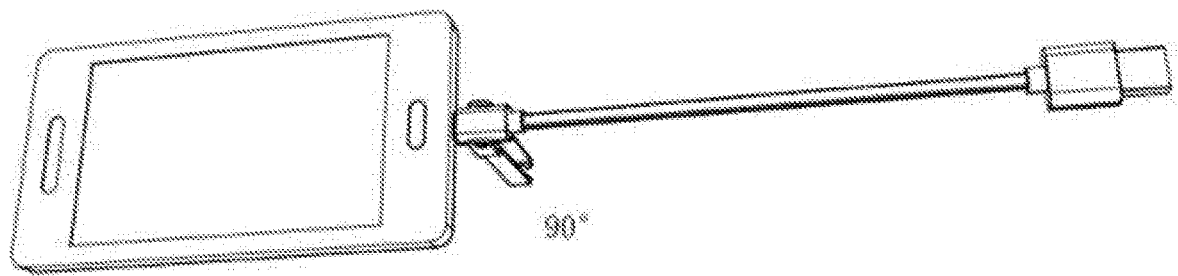
FIG. 12 is a diagram of a transmission line with a foldable bracket connected to an electronic device, showing a support member (4) at a rotation angle of 90° (open position) in Embodiment 4 of the present invention, according to one embodiment.
Figure 13:
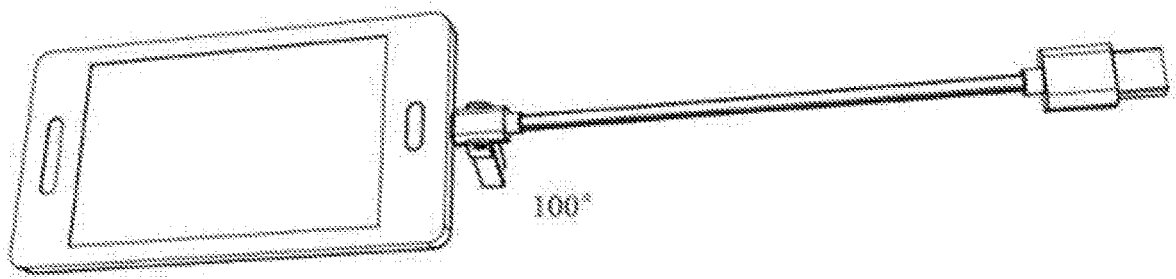
FIG. 13 and FIG. 14 are diagrams of a transmission line with a foldable bracket connected to an electronic device, showing a support member (4) at a rotation angle of 100° (open position) in Embodiment 4 of the present invention, according to one embodiment.
Figure 14:
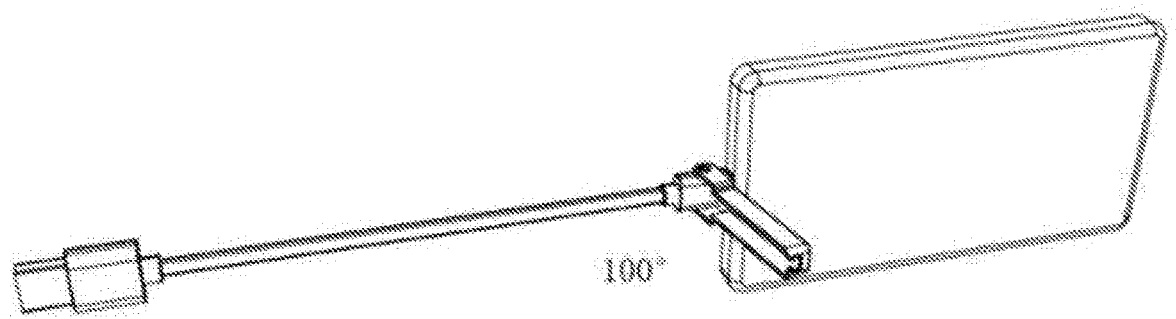

FIG. 8-10 show the present invention in Embodiment 3 where the rotation angel of the supporting members (4) is 0°, 90°, and 100°, respectively. FIGS. 11-14 are diagrams of the Embodiment 3 when the transmission line is connected to an electronic mobile device. Embodiment 2 are similar to Embodiment 3, except that the shape of the wire body and the recess (14) on the short side wall (8) are different.

Embodiment 4

More flexibility is introduced by introducing a supporting member (4) that is capable of extension. As shown in FIG. 15-18, the supporting member (4) can be an extendable foldable bracket, which allows the supporting member (4) to have a flexible, adjustable length so that a user can adjust the viewing-angle of an electronic device. The connecting portion (5) comprises a fixed-length segment (210) that further comprises two connecting arms (110), a wire-holding slot (120), and a buckle beam (24) on the back of the wire-holding slot (120); the supporting portion (6) comprises an movable segment (211) that further comprises a receiving slot (21), a closing buckle (22), and at least one extension buckle (23);

The extendable foldable bracket can be in a non-extended position or an extended position. In the non-extended position, the receiving slot (21) surrounds or wraps around the wire-holding slot (120); in the extended position, the receiving slot (21) does not surround the wire-holding slot (120), by moving away, or gliding along the wire-holding slot (120). The non-extended position is maintained by the interaction of the buckle beam (24) with the closing buckle (22), and the extended position is maintained by the interaction of the buckle beam (24) with the extension buckle (23).

Figure 15:
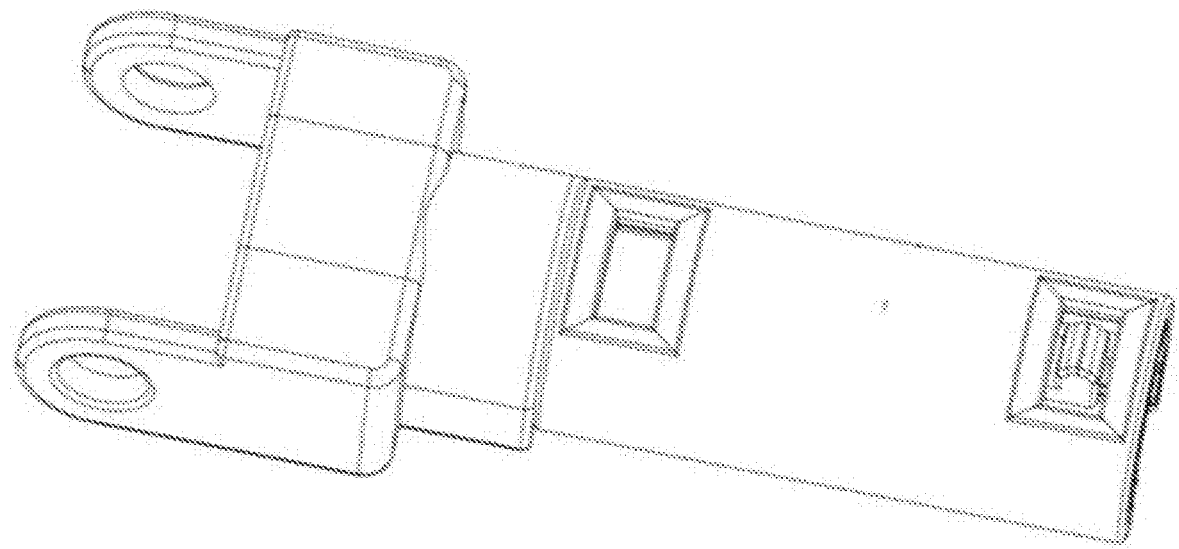
FIG. 15 is a diagram of a support member (4) of an extendable foldable bracket in a non-extended position, in Embodiment 5 of the present invention, according to one embodiment.
Figure 16:
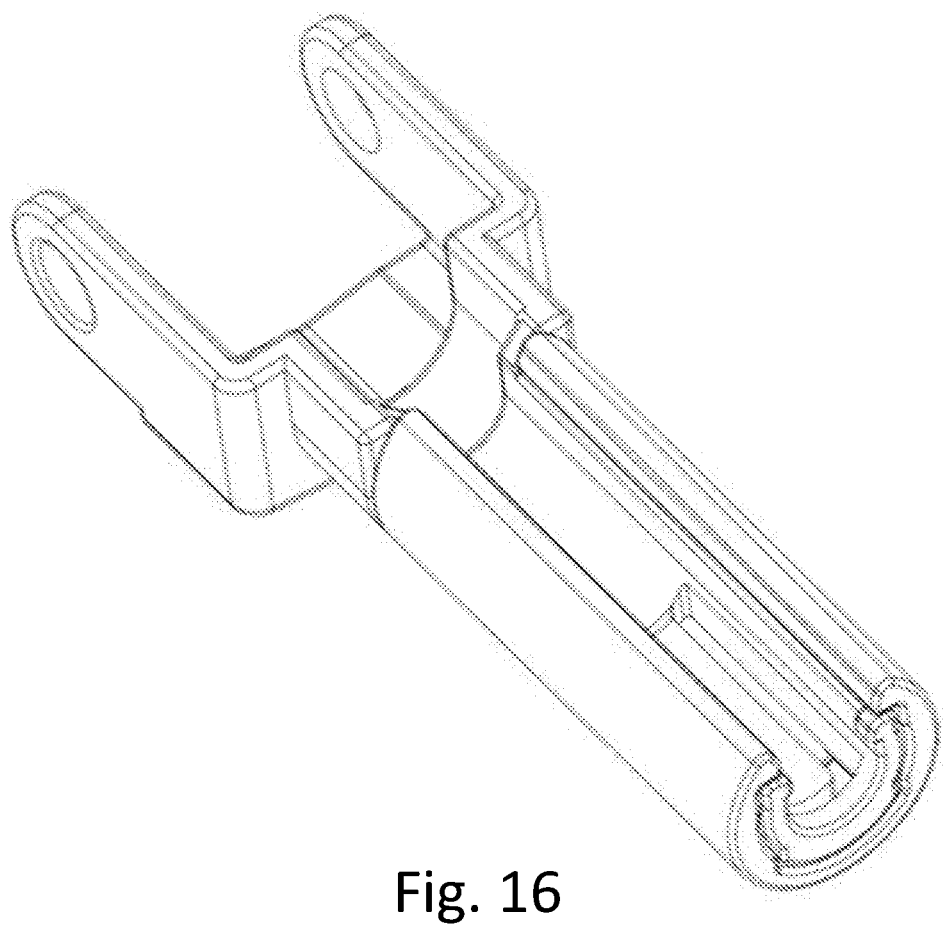
FIG. 16 is a diagram of a support member (4) of an extendable foldable bracket in a non-extended position, in Embodiment 5 of the present invention, according to one embodiment.
Figure 17:
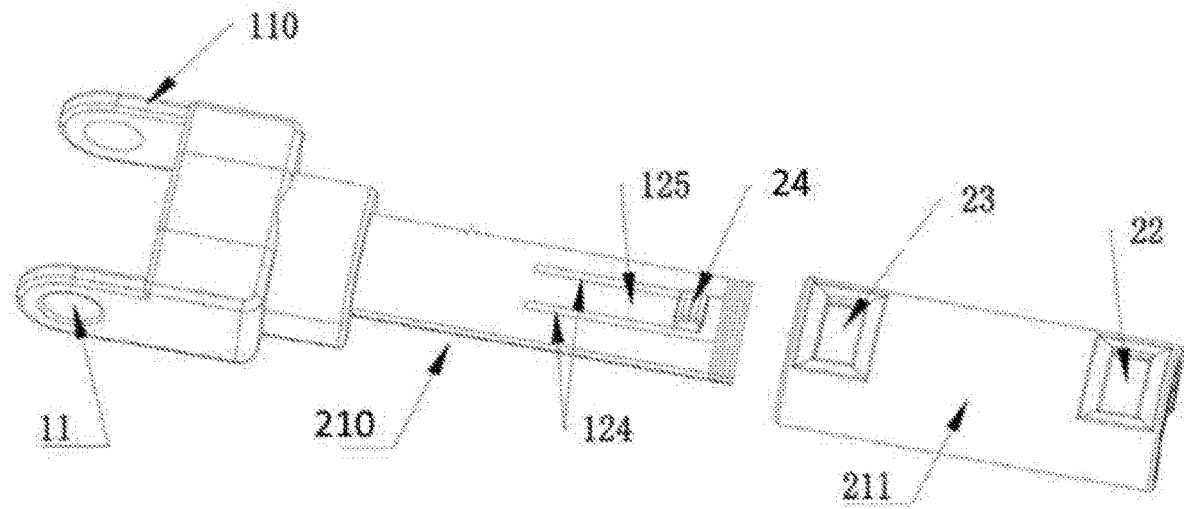
FIG. 17 is a diagram of a support member (4) of an extendable foldable bracket in a disassembled state, in Embodiment 5 of the present invention, according to one embodiment.
Figure 18:
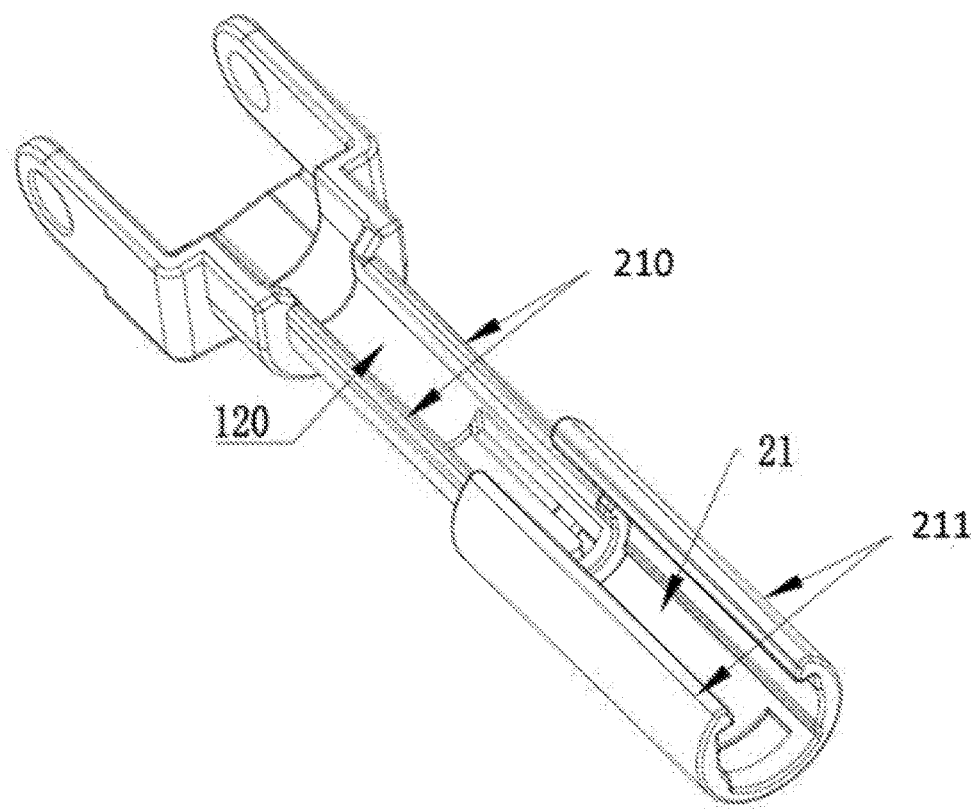
FIG. 18 is a diagram of a support member (4) of an extendable foldable bracket in an extended position in Embodiment 5 of the present invention, according to one embodiment.

Although only one extension buckle (23) is shown in FIG. 15, there can be more than one extension buckles (23), so that there can be more than one extended position, which allows multiple length choices and viewing angle choices for users.

The extendable foldable bracket is rotatably connected to the first connector (1) to form a rotatory connection. A protrusion portion (10) is disposed on each side of the first connector (1); and a connection hole (11) is disposed on each of the two connecting arms (110) of the support member (4), wherein the protrusion portions (10) are inserted into the connection holes (11) to form the rotatory connection.

The wire-holding slot (120) comprises two side walls and a bottom wall that forms a slot to hold wire/line. The receiving slot (121) also comprises two side walls and a bottom wall that forms a slot that can snuggly holds or surrounds the wire-holding slot (120). The intersection of the wire-holding slot (120) and the receiving slot (121) can be a C-shape, U-shape, or other suitable shape. The intersection of the extendable foldable bracket can be circle, square, rectangle, or other suitable shape.

A rectangular elastic piece (125) is provided on the wire-holding slot (120), with one end connected to the bottom wall of the wire-holding slot (120) and a free end on which the buckle beam (24) is attached. The rectangular elastic piece (125) is formed by two parallel opening stripes (124) that cut through the bottom wall and one perpendicular stripe that also cuts through the bottom wall adjacent to the free end. In the non-extended position, the buckle beam (24) is rested inside the closing buckle (22) to lock up the position; to move to the extended position, the movable segment (211) is pulled or glided away from the fixed-length segment (210); in the extended position, the buckle beam (24) is rested inside the extension buckle (23) to lock up the position. The movable segment (211) and the fixed-length segment (210) can be made of plastics or other material with suitable elasticity, to allow proper dissociation and association of the buckle beam (24) with both the closing buckle (22) and the extension buckle (23). The closing buckle (22) and the extension buckle (23) can be a through hole or a recess; as long as they hold the buckle beam (24) snugly.

Figure 19:
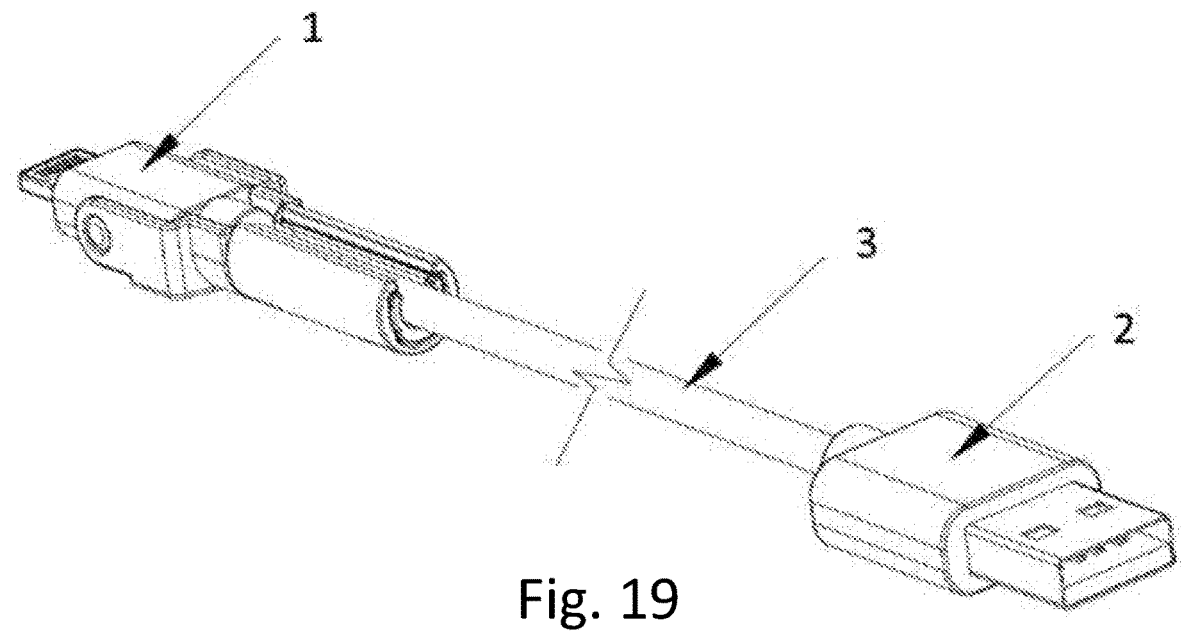
FIG. 19 is diagram of a transmission line with an extendable foldable bracket, according to one embodiment.
Figure 20:
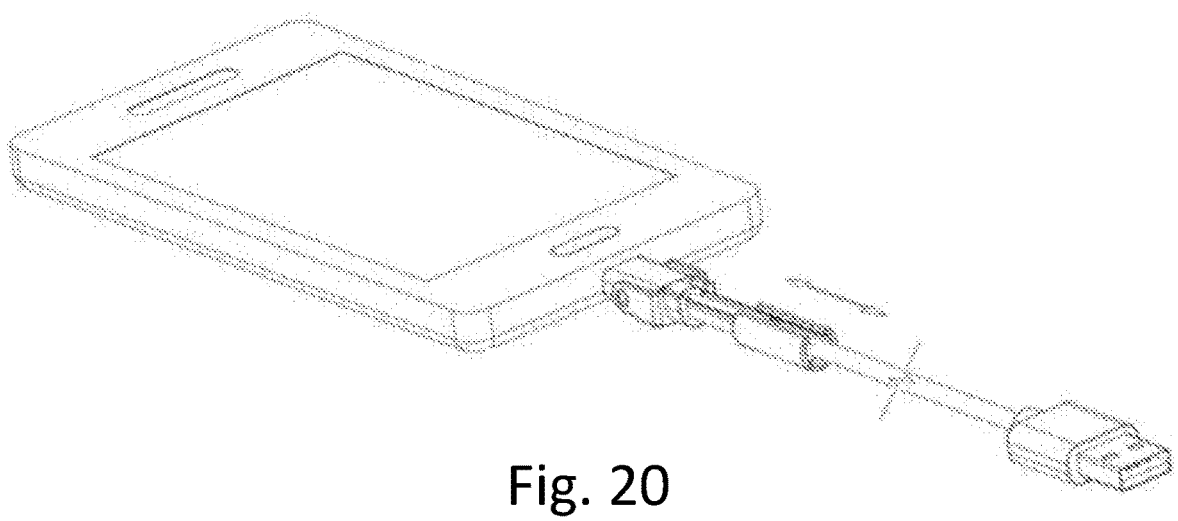
FIG. 20 is diagram of a transmission line with an extendable foldable bracket, in an extended, closed position and connected to an electronic device, according to one embodiment.
Figure 21:
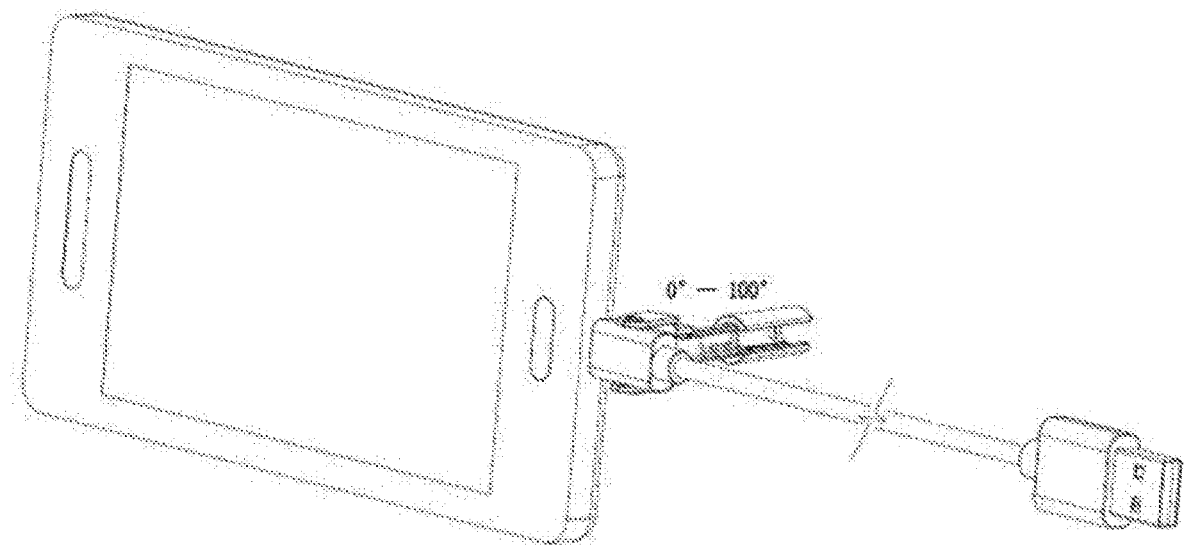
FIG. 21 is diagram of a transmission line with an extendable foldable bracket, in an extended, open position and connected to an electronic device, according to one embodiment.

FIG. 19 is a diagram of the transmission line with the extendable foldable bracket in Embodiment 4, according to one embodiment. FIG. 20 is a diagram of the transmission line with the extendable foldable bracket, in an extended, but closed position and connected to an electronic device, according to one embodiment. FIG. 21 is a diagram of the transmission line with the extendable foldable bracket, in an extended, open position and connected to an electronic device, according to one embodiment.

Embodiment 5

Figure 22:
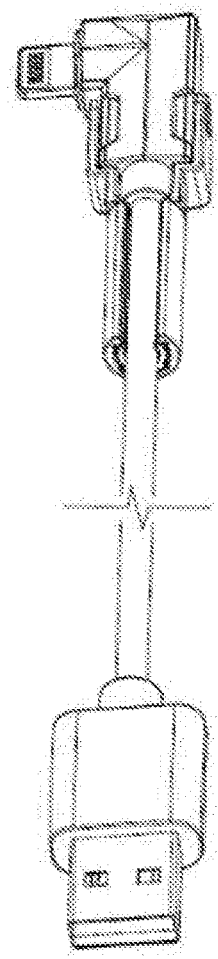
FIG. 22 is diagram of a transmission line with an extendable foldable bracket with an angled connector, according to one embodiment.
Figure 23:
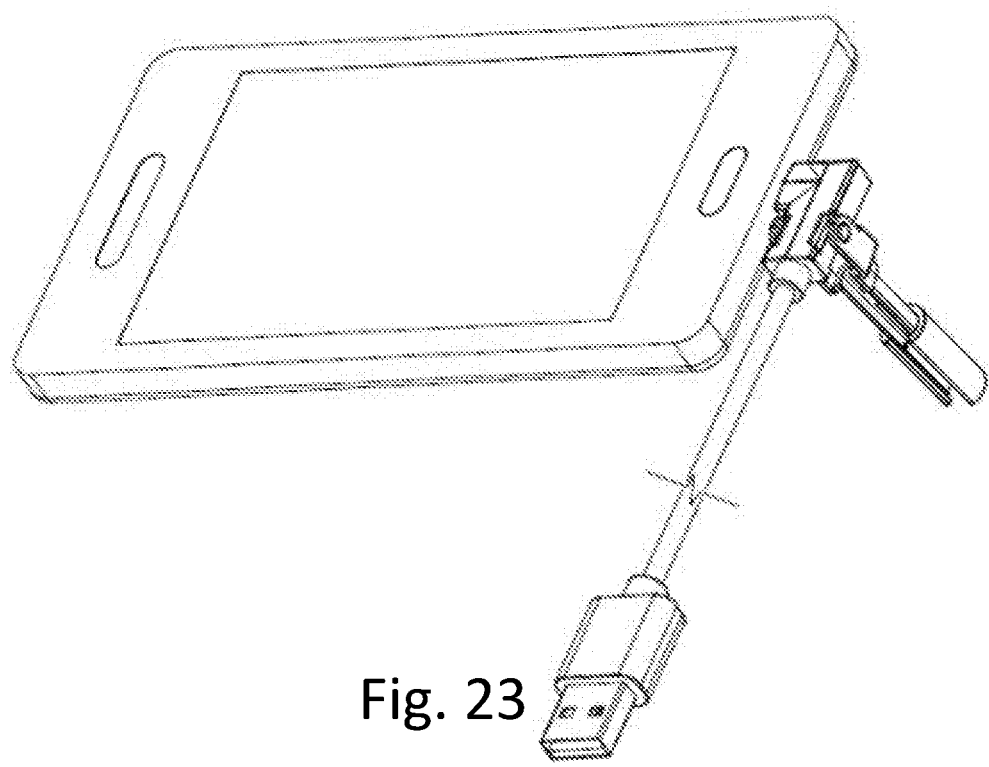
FIG. 23 is diagram of a transmission line with an extendable foldable bracket, in an extended, open position and connected to an electronic device, according to one embodiment.
Figure 24:
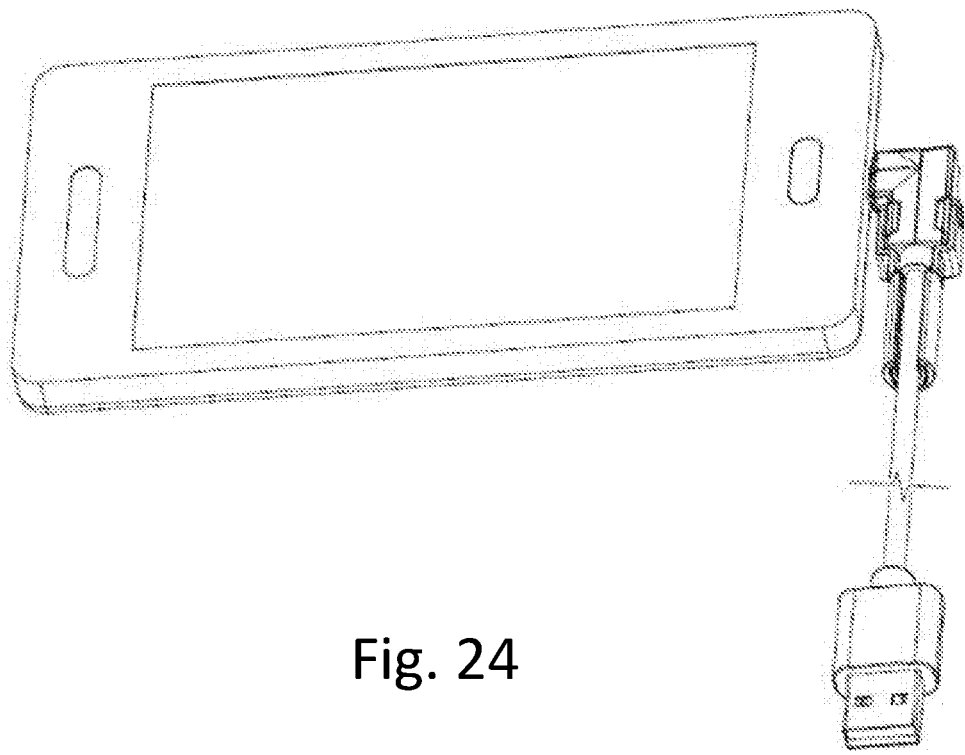
FIG. 24 is diagram of a transmission line with an extendable foldable bracket, in a non-extended, closed position and connected to an electronic device, according to one embodiment.

The first connector (1) can be an angled connector relative to the wire body (3), as shown in FIG. 22 to FIG. 24. FIG. 22 is diagram of a transmission line with an extendable foldable bracket, in non-extended, closed position; FIG. 23 is diagram of the transmission line with the extendable foldable bracket, in an extended, open position and connected to an electronic device; FIG. 24 is diagram of the transmission line with the extendable foldable bracket, in a non-extended, closed position and connected to an electronic device.

Embodiment 6

Figure 25:
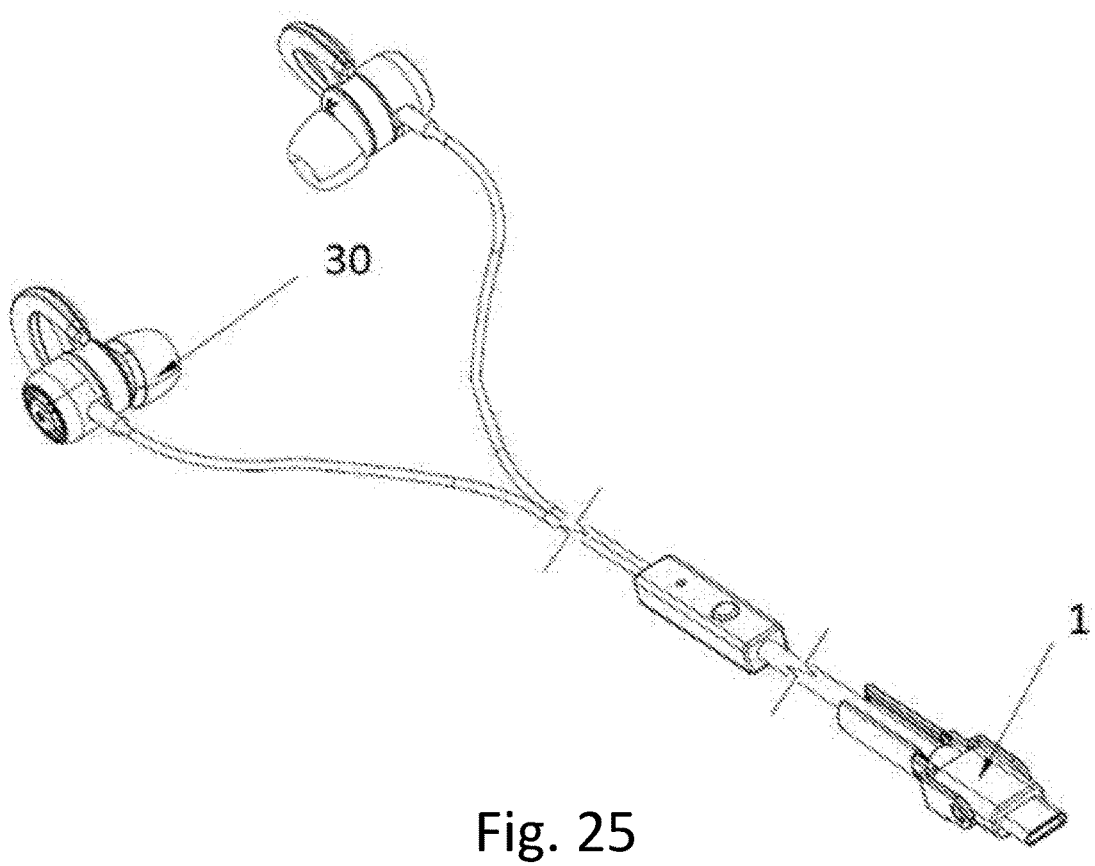
FIG. 25 is diagram of a transmission line with an extendable foldable bracket, wherein the second connector (2) is connected to a pair of earphones (30).
Figure 26:
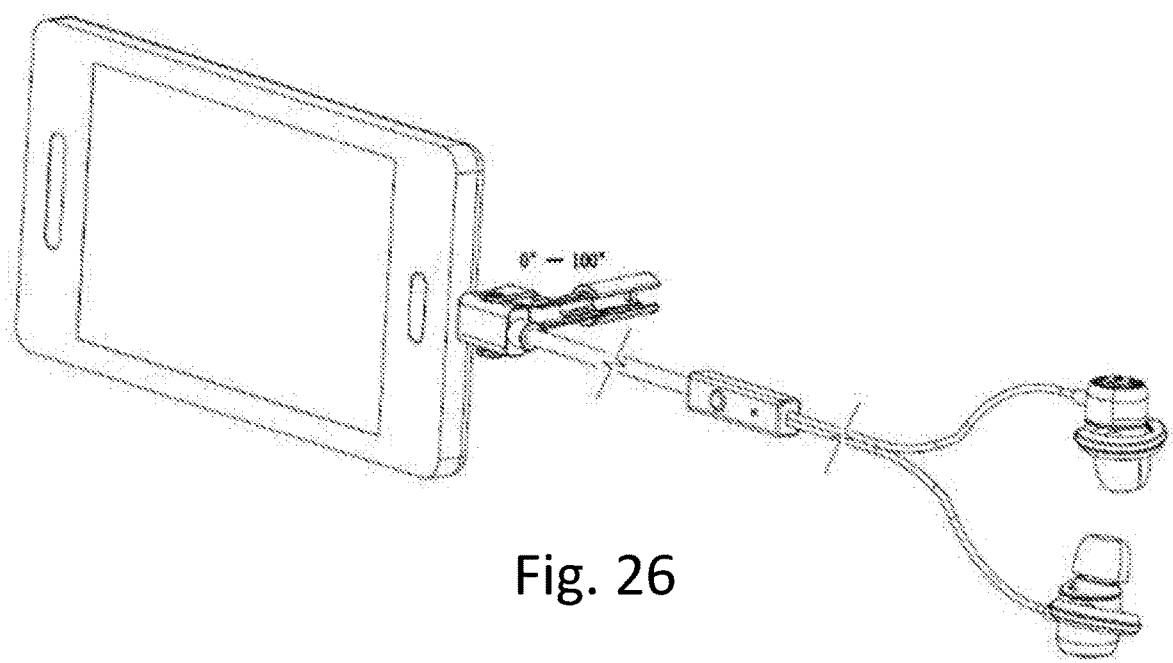
FIG. 26 is diagram of a transmission line with an extendable foldable bracket, wherein the second connector (2) is connected to a pair of earphones (30), and the first connector (1) is connected to an electronic device, and the bracket is in an extended, open position.
Figure 27:
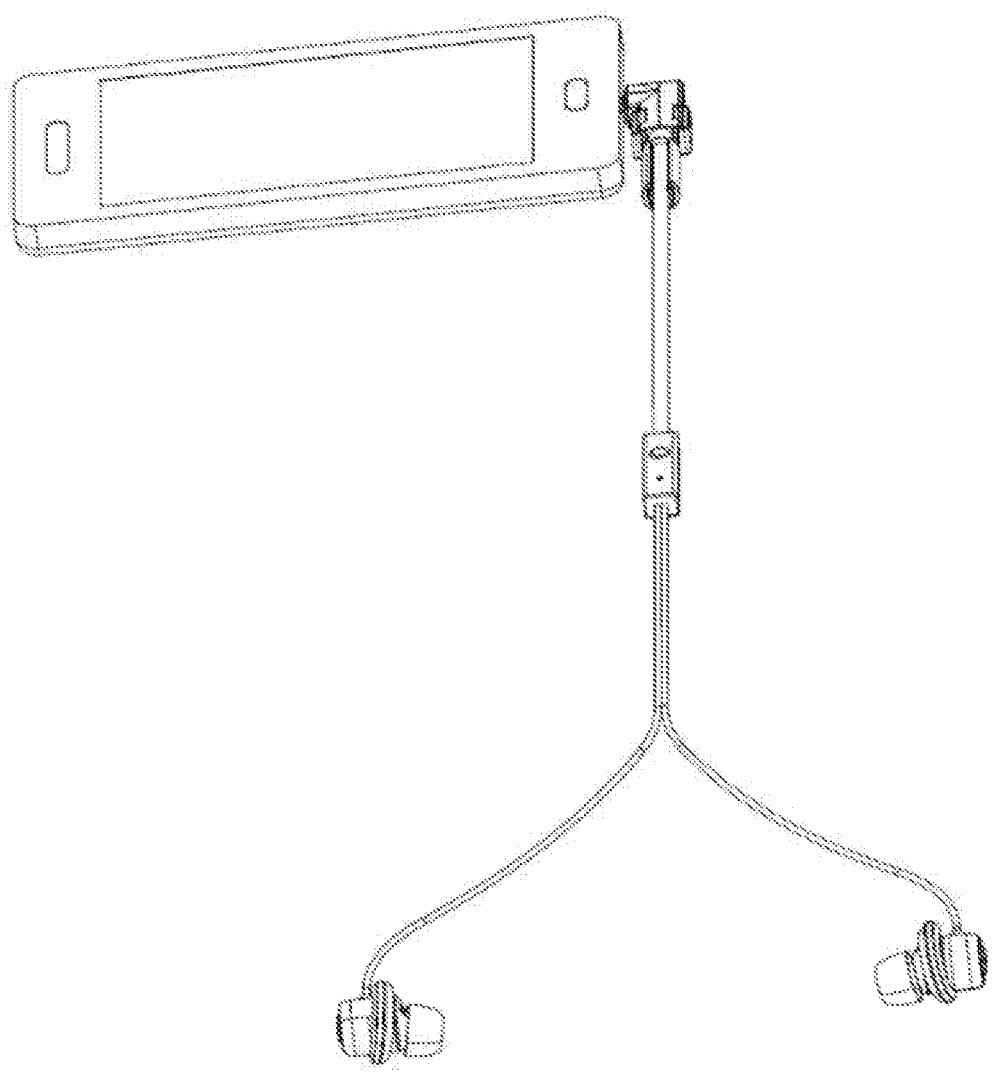
FIG. 27 is diagram of a transmission line with an extendable foldable bracket, wherein the second connector (2) is connected to a pair of earphones (30), and the first connector (1) is connected to an electronic device, and the bracket is in a non-extended, closed position.

The second connector (2) can be a plug connected to a pair of earphones (30), as shown in FIG. 25 and FIG. 26. For example, 3.5 mm earphones can be installed.

The transmission line is a data line (data transmission line, or data cable), a charging line, a headphone, an earphone line, a combined data/charging line, a combined charging/earphone line, a combined charging/headphone line, a combined data/charging/headphone line, a combined data/charging/earphone line, or simply an adaptor. The first connector (1) may be a standard USB, a mini USB, a Micro USB, a double-faced USB, USB Type-C or an Apple Lightening. Other configurations and combinations are possible.

It should be noted that the wire body (3) in the drawings of the present invention are all drawn straight, but it does not mean that the wire body (3) can only be straight in practical applications. Those skilled in the art should know that the wire body of a data line or a charging wire is a metal wire wrapped within a plastic material and can be bent at will. In addition, the above several embodiments are described by using a common circular and flat wire body as an example. In practical applications, the wire body may also be other transmission lines of any shape, all of which are within the protection scope of the present invention.

According to the embodiments of the present invention, since the support member (4) is implemented on a common transmission line, the mobile phone or the tablet connected to the transmission line can be stably supported during charging or transmission, thereby liberating the user's hands and enhancing the user experience. In addition, the present invention also designs a manner of controlling the opening angle of the support member (4) and a recess for holding the wire body, so that the solution of the present invention is better applied.

While the invention has been particularly shown and described as referenced to the embodiments thereof, those skilled in the art will understand that the foregoing and other changes in form and detail may be made therein without departing from the spirit and scope of the invention. It is to be understood that the above description is not intended to limit the present invention, and any modifications, equivalent substitutions, improvements, etc., made within the spirit and principles of the present invention, shall be included in the scope of protection of the present invention.

What is claimed is:

1. A transmission line with a plug having a foldable bracket for supporting an electronic device, comprising:
    a first connector (1);
    a second connector (2);
    a wire body (3); and
    a support member (4), further comprising:
        a connecting portion (5); and
        a supporting portion (6) of a semi-closed groove, further comprising:
            two long side walls (7);
            a short side wall (8); further comprising a notch (12) disposed on the short side wall (8), wherein when the support member (4) is closed, the wire body (3) passes through the notch (12) in a close fit and is maintained in position; and
            a rear wall (9);
    wherein the first connector (1) and the second connector (2) are connected through the wire body (3); wherein the connecting portion (5) is disposed on the first connector (1) and pivoted to the first connector (1) rotatably to form a rotatory connection, so that the supporting portion (6) can rotate around the pivot.

2. The transmission line with a plug having a foldable bracket for supporting an electronic device according to claim 1, wherein the notch (12) is circular arc-shaped or square-shaped.

3. The transmission line with a plug having a foldable bracket for supporting an electronic device according to claim 1, wherein a recess (14) is provided on the rear wall (9), wherein when the support member (4) is opened to the maximum angle, the recess (14) pushes against the first connector (1) to keep the maximum angle between the support member (4) and the first connector (1) at 100° C.

4. A transmission line with a plug having a foldable bracket for supporting an electronic device, comprising:
    a first connector (1);
    a second connector (2);
    a wire body (3); and
    a support member (4), further comprising:
        a connecting portion (5); and
        a supporting portion (6),
        wherein the connecting portion (5) is disposed on the first connector (1) and pivoted to the first connector (1) rotatably to form a rotatory connection, so that the supporting portion (6) can rotate around the pivot;
        wherein the connecting portion (5) comprises a fixed-length segment (210) that further comprises two connecting arms (110), a wire-holding slot (120), and a buckle beam (24) on the back of the wire-holding slot (120);
    wherein the supporting portion (6) comprises movable segment (211) that further comprises a receiving slot (21), a closing buckle (22), and at least one extension buckle (23); and
    wherein the receiving slot (21) is configured to move along the wire-holding slot (120) between a non-extended position and an extended position, wherein the non-extended position is configured to be maintained by the interaction of the buckle beam (24) with the closing buckle (22), and the extended position is configured to be maintained by the interaction of the buckle beam (24) with the extension buckle (23).

5. The transmission line with a plug having a foldable bracket for supporting an electronic device according to claim 4, further comprising a protrusion portion (10) disposed on each side of the first connector (1); and a connection hole (11) on each of the two connecting arms (110) of the support member (4), wherein the protrusion portions (10) are inserted into the connection holes (11) to form the rotatory connection.

6. The transmission line with a plug having a foldable bracket for supporting an electronic device according to claim 4, wherein the wire-holding slot (120) comprises two side walls and a bottom wall that forms a slot to hold wires.

7. The transmission line with a plug having a foldable bracket for supporting an electronic device according to claim 5, further comprising a rectangular elastic piece (125) with one end connected to the bottom wall, and a free end on which the buckle beam (24) is attached, wherein the rectangular elastic piece (125) is formed by two parallel opening stripes (124) that cut through the bottom wall and one perpendicular stripe that also cuts through the bottom wall at the free end.

8. The transmission line with a plug having a foldable bracket for supporting an electronic device according to claim 1, wherein the second connector is plug that connected to an earphone ((30).

9. The transmission line with a plug having a foldable bracket for supporting an electronic device according to claim 1, wherein the first connector (1) is a plug for connecting an electronic mobile device.

10. The transmission line with a plug having a foldable bracket for supporting an electronic device according to claim 9, wherein the electronic mobile device is a mobile phone or a tablet computing device.

11. The transmission line with a plug having a foldable bracket for supporting an electronic device according to claim 1, wherein the transmission line is a data line or a charging cable.

12. The transmission line with a plug having a foldable bracket for supporting an electronic device according to claim 1, wherein the supporting portion (6) of the support member (4) has a rotation angle of [0°, 100°]; when the supporting portion (6) is closed, the angle between the center line of the support member (4) and the plane in which the first connector (1) is inserted is 0°; when the supporting portion (6) is opened at the maximum angle, the angle between the center line of the support member (4) and the plane in which the first connector (1) is inserted is 100°.

13. The transmission line with a plug having foldable bracket for supporting an electronic device according to claim 1, further comprising a protrusion portion (10) disposed on each side of the first connector (1); and a connection hole (11) on each of the long side walls (7) of the support member (4), wherein the protrusion portions (10) are inserted into the connection holes (11) to form the rotatory connection.

\* \* \* \* \*